Dec. 13, 1932.   O. F. SHEPARD   1,890,754
MOTOR CONTROL
Filed May 9, 1930   5 Sheets-Sheet 1

Inventor
Oscar F. Shepard
By Murray and Gugelter
Attorneys

Dec. 13, 1932.　　O. F. SHEPARD　　1,890,754
MOTOR CONTROL
Filed May 9, 1930　　5 Sheets-Sheet 2

Fig. 4.

Inventor
Oscar F. Shepard
By Murray & Zugelter
Attorneys

Patented Dec. 13, 1932

1,890,754

UNITED STATES PATENT OFFICE

OSCAR F. SHEPARD, OF CINCINNATI, OHIO

MOTOR CONTROL

Application filed May 9, 1930. Serial No. 451,157.

This invention relates to an electrical operating circuit and control means therefor and which may be adapted to various uses including the control and operation of electric elevators and the like.

An object of the invention is to provide means operating with direct current for controlling an electrical system in which the operating circuit employs alternating current.
Another object is to provide a system of the character indicated wherein the direct current is obtained from the alternating current supply.

Another object is to obviate certain objectionable features found in alternating current systems, such as are common in the motor brake, etc.

Another object is to provide a system wherein the parts are so related that commercial rectifiers may be used and which rectifiers will be protected against long and continuous periods of operation.

Another object of the invention is to provide a commercially satisfactory system in which the alternating current may be used for operating a rectifier and which rectifier may be so controlled and operated that it will be energized only while it is required for operating the control devices.
These and other objects are attained by the means described herein and disclosed in the accompanying drawings, in which:

The various systems of control and operation shown in the accompanying drawings illustrate the flexibility of the invention, and the inclusion or exclusion of various elements in various of the systems illustrated, is not to be understood as indicating that the same elements which have been omitted from some of the other systems, are not applicable in any or all of the systems.

Figures 1, 2:
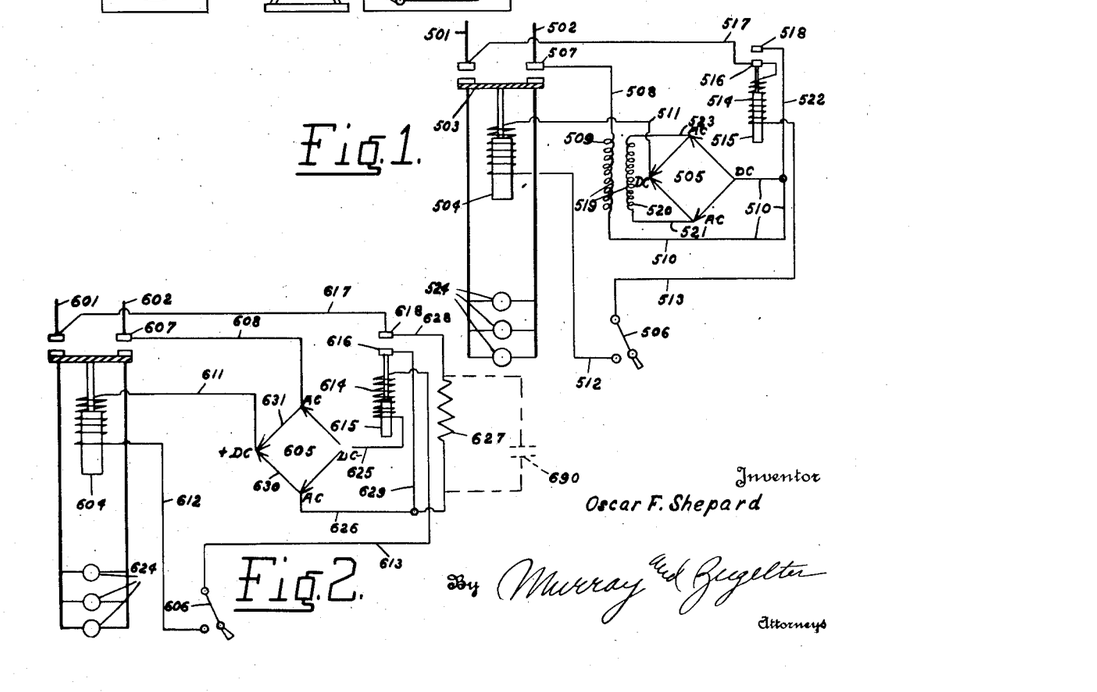
Fig. 1 shows a simple electrical circuit, parts shown diagrammatically, and embodying the invention and applied to a simple lighting system or operating system.
Fig. 2 shows diagrammatically, a modified form of circuit embodying the invention.

Referring to Fig. 1 the main line alternating current leads are indicated as 501 and 502. Line 501 is connected to an A. C. terminal of rectifier 505, by way of conductor 517, contact 516, coil 514 of relay 515, conductor 513, switch 506, conductor 512, coil of electromagnet 504 of main switch or translating device 503 and conductor 511. Line 502 is connected to an A. C. terminal of the rectifier by way of contact 507, conductor 508, primary coil 509 of transformer 519, and conductor 510. Upon closing of switch 506 a half wave rectified current passes from a D. C. terminal of the rectifier to conductor 511 to coil of electromagnet 504 to conductor 512, through switch 506, to conductor 513 to coil 514 of relay 515. The relay 515 is sensitive enough to react to the half wave rectification with the primary of the transformer in series and closes the contacts 516 and 518, thereby throwing the primary coil 509 of transformer 519 across the main lines 501 and 502, whereupon full wave rectification is attained. Direct current from one of the D. C. terminals of the rectifier passes to conductor 511, to coil of electromagnet 504, to conductor 512; to switch 506 to conductor 513 to coil 514 of electromagnet or relay 515, to contacts 516 and 518 to conductor 522, to conductor 510 to the second D. C. terminal of the rectifier. As soon as full wave rectified current is fed to contactor electromagnet 504, the main switch 503 is closed and the load 524 is connected to the main lines 501 and 502. Opening of switch 506 interrupts the rectified circuit, and the main switch is opened.

In the modification shown in Fig. 2, the rectifier 605 is kept energized in the off position of switch 606, through a relatively high resistance 627, with circuit as follows: feeder 601 to conductor 617, contact 618, conductor 628, resistance 627, conductor 626 to A. C. terminal of rectifier, from other A. C. terminal of rectifier to conductor 608, contact 607 to feeder 602. The closing of control switch 606 closes the D. C. circuit of the rectifier through the coil of main switch 604 and relay 615, as follows: D. C. terminal of rectifier to conductor 611, coil of switch 604, conductor 612, switch 606, conductor 613, coil 614 to D. C. terminal of rectifier. The relay 614 is sensitive enough to function on the weak current and closes its contacts 616 and 618 which bridges out the resistance 627 and gives full D. C. voltage and current to coil 604. Opening of switch 606 opens the circuit to coils 604 and 614. When coil is deenergized, the relay opens and inserts resistance 627 in circuit with the rectifier. A condenser 690 of proper capacity can be substituted for resistance 627 and will be equally effective in operation and in keeping down losses when switch 606 is open.

Figure 3:
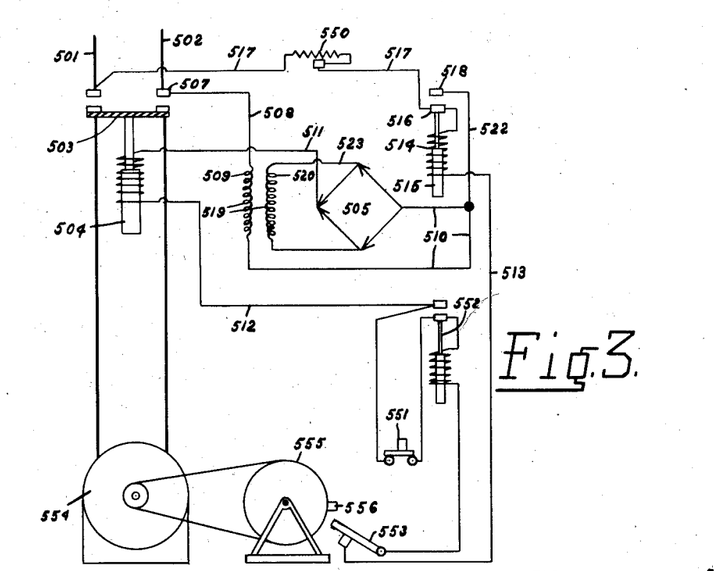
Fig. 3 shows diagrammatically, a modified form of the invention, showing a simple application of the invention to an elevator system.

In the modification shown in Fig. 3 is disclosed a simple elevator control system, using the form of control system shown in Fig. 1. The parts of the systems common to both Fig. 1 and 3 are identified by the same reference characters. The addition of a thermal relay or time control element 550, start button 551 holding relay 552, stop motion switch 553, motor 554 and load 555, do not vary the functioning of the circuits shown in Fig. 3 from the circuits as explained in connection with Fig. 1. The motor 554 is used for operating a cable drum associated with the load or elevator cab, represented as 555, and the stop motion switch 506, start button 551 and holding relay 552 indicate commonly used devices in elevator operating systems, all of which are individually old. The start button 551 and stop motion switch 553 have jointly, the function of the manually operable switch 506 shown in Fig. 1. The lug 556 on the drum 555 functions to open the switch 553 to interrupt the rectified current circuit and stop the motor. Upon subsequent resetting or closing of switch 553, subsequent closing of the circuit by means of the start button 551 eventuates in operation of motor 554.

Figs. 4 to 7 inclusive show the invention as applied to various types of elevator systems.

Figure 4:
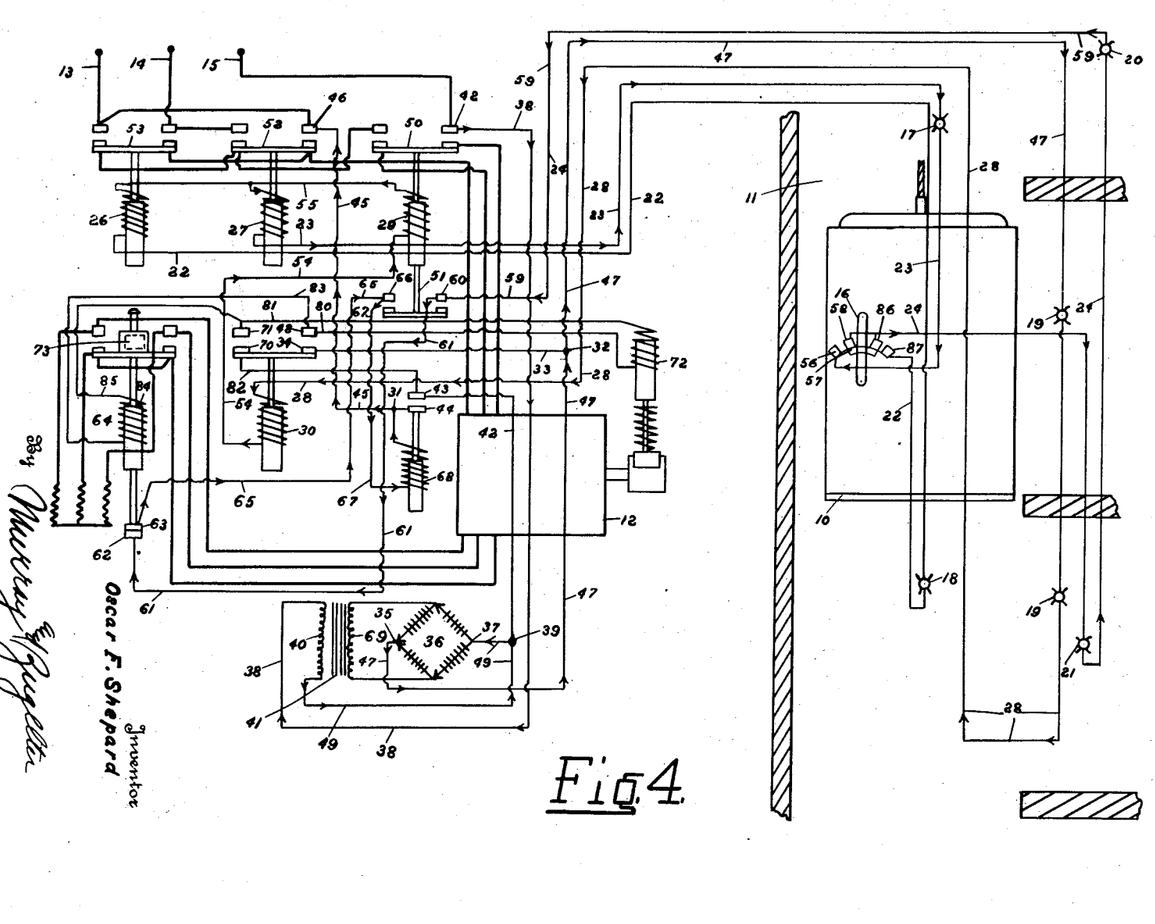
Fig. 4 shows a diagrammatic or wiring system embodying one form of the invention and comprising a manually operable control system.

Referring to Fig. 4, the elevator cab 10 is raised and lowered in an appropriate shaft 11, by means of a suitable motor 12. The motor 12 is supplied with alternating current from the power lines 13, 14 and 15 through suitable control means that will be explained in detail hereafter. Within the elevator cab 10 is provided a manual control means or lever 16, from which suitable electric conductors 22, 23 and 24 extend and which may pass through any of the various protective and safety devices such as the direction limit switches 17, 18, door switches 19, and final limit switches 20 and 21, as are commonly employed in systems of this character. The parts are so related that upon operation of the lever 16 in the cab, a half wave rectified current is passed through relay 68 for operating that relay for closing a circuit to the rectifier so that full wave rectified current is obtained for operating two of the main switches 26, 27 and 29. The selective operation of one of the main switches 26 and 27 with the main or potential switch 29 is controlled by this manually operable switch 16 in the cab. In this manner, direction of movement of the cab 10 is controlled. In operation, upon movement of manual control device 16 for closing a circuit, which may be termed the initial circuit, and which circuit we shall assume shall be the one for effecting upward movement of the elevator, current or electrical energy passes from main line contact 42 of the potential switch 29, and which contact 42 is at all times connected with the main power supply 15, along the course indicated by the single arrow heads provided along such circuit. Tracing the circuit from contact 42 it follows and passes through conductor 38 to coil 40 of transformer 41, to conductor 49, to junction 39, through rectifier 36, to conductor 47, past junction 32, through door switches 19, to conductor 28, to the coil of brake control device or switch 30, to conductor 54, to potential device or main switch 29, to conductor 55, through "up" switch or device 27 to conductor 23, through hatchway direction switch 17, to contacts 56, 57 and 58 of device 16, to conductor 24, to final limit switches 21 and 20, to conductor 59, to contact 60 of potential device 29, to conductor 61, to contacts 62 and 63 of resistance cut out device or switch 64, to conductor 65 to contact 66 of potential switch 29, to conductor 67, to relay device of switch 68 to junction 31 to conductor 45 to contact 46 of main switch 52, and which contact 46 is at all times connected with the main power supply 13.

The alternating current supply received from main switch contacts 42 and 46, through the rectifier from 49 to 47 provides a half wave rectification that is sufficient to operate the relay 68, creating a shunt at contacts 44 and 43 at relay 68, thereby establishing an alternating current circuit including main switch contact 46, conductor 45, contacts 44 and 43 of relay device 68, conductor 42, past junction 39, to conductor 49, to transformer coil 40, to conductor 38, to main line contact 42, whereby the primary coil 40 of the transformer is thrown directly across the alternating current line from 13 to 15. Then the secondary coil 69 of transformer causes full voltage on the rectifier, which furnishes a full wave rectification, furnishing direct current to and operating the direction switch 27, potential switch 29 and brake control switch 30. When the brake control switch 30 closes its contacts 34 and 48 and 70 and 71, rectified current is supplied to the brake magnet 72 and resistance cut out device or switch 64. A suitable movement retarding device such as dash pot 73 may be provided with the resistance cut out device 64. The circuits of full wave rectified current follow a course beginning at one or the other of the ends of coil 69 of transformer, through the rectifier to conductor 47 to junction 32. From junction 32 some rectified current passes to the various devices connected with conductor 47, and associated with the cab 10 and the shaft in which the cab operates, as previously traced in connection with the half wave rectified current, while part of the full wave rectified current leaves conductor 47 at junction 32 and passes over conductor 33 to contacts 34 and 48, to conductor 83 to cut out 64, to conductor 85, to contacts 71 and 70 to conductor 82 to contact 43 to conductors 42 and 49, through rectifier to coil 69 of transformer. Other full wave rectified current after passing from junction 32 to contacts 34 and 48 follows conductor 80 to brake magnet 72 to conductor 81 to contacts 71 and 70 and thence over and beyond conductor 82 as previously traced to transformer coil 69. Upon separation of contacts 62 and 63 of the cut out device 64, the relay 68 is retained in circuit with the manually operable control switch 16 because of operation of main switch or potential switch 29 with which is associated the secondary switch 51, and which secondary switch is closed when the main switch is closed. Upon closing of switch 51, the contact 60 is connected with contact 66. Full wave rectified current is supplied to the circuit embracing the manual control switch 16 and the relay 68, and as soon as that circuit is opened by operation of manual control switch 16, the connection across the main power lines to the transformer is opened because opening of the rectified circuit including the coil of relay switch 68, causes separation of relay switch contacts 43 and 44, wherefore the various parts are returned to normal, inoperative positions and the elevator comes to rest.

Main switch 26 may be termed the "down" switch and is actuated in event manual control switch 16 should be actuated to complete circuits through contacts 86 and 87 for effecting downward movement of cab 10, under which circumstances the conductor 22 would be included first in the half wave rectified current circuit and then in the full wave rectified current circuit in lieu of conductor 23, and main switch 53 would be actuated in lieu of main switch 52, otherwise the operation of parts would be the same. All contacts and relays are direct current devices.

Figure 5:
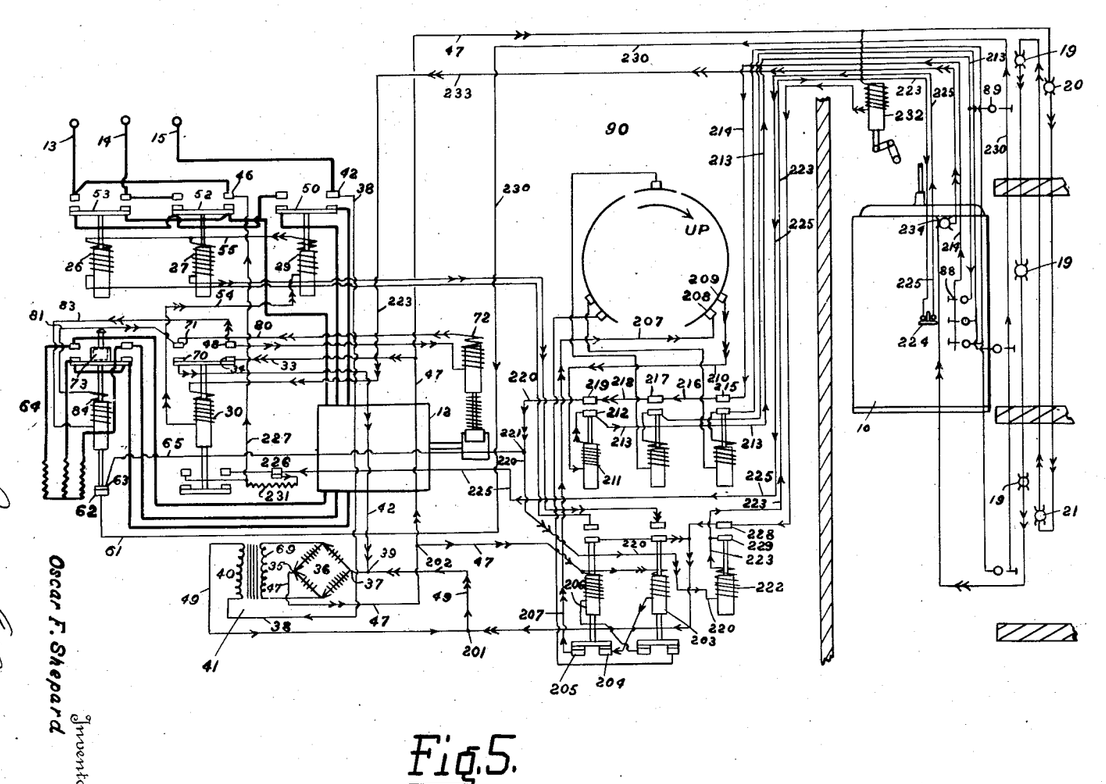
Fig. 5 shows another embodiment of the invention, applied to an automatic elevator system.

In Fig. 5, the invention is illustrated as applied to an automatic elevator system. In explaining this system it will be assumed, similarly as in connection with Fig. 4, that the elevator cab is to be moved upwardly, wherefore either the button or switch 88 in the cab, or switch 89 at a floor above the cab has been actuated to close the initial circuit. In automatic systems, it is common to provide floor leveling devices, and such a device is illustrated generally below the reference character 90. The floor leveling device may be of the character shown in such patents as Ihlder 820,499 and others. No detailed explanation of the floor leveler is necessary, it being sufficient to know that same comprises movable contacts that are actuated relative to fixed contacts, and that a connection is provided between the cab 10 and the carrier of the movable contacts, that when the cab floor reaches the level of the floor at which the cab is to stop, the movable and fixed contacts separate and the circuit controlling operation of the motor 12 is opened, and the cab comes to rest. In automatic elevators, safety devices, in addition to those mentioned in connection with Fig. 4, are employed, for example, suitable cams and switches, that prevent opening of the doors of the cab, and at the various floor levels and controlling access to the elevator shaft, so the door can not be opened unless the cab is stationary at a selected floor, and so the cab can not be moved unless all the doors to the cab and elevator shaft are closed. These features are all used in connection with elevator installations, wherefore detailed explanation of them is unnecessary. The various parts or elements used in such systems are, however, diagrammatically disclosed in the drawings and same will be generally referred to herein. In so far as the same reference characters used in connection with Fig. 4, may be used in connection with Fig. 5, same will be done.

Assuming, as previously stated, that one of the up buttons was actuated, the initial circuit will be pointed out. The initial circuit, beginning at main line contact 42 in Fig. 5, follows the single headed arrows to conductor 38, to primary coil 40 of transformer 41, to conductor 49, past junction 201, to terminal 37 of rectifier 36, through rectifier 36, to terminal 35, to conductor 47, past junction 202, to coil of the up interlock magnet 203, to switch contacts 204 and 205 of the down interlock magnet 206, to conductor 207, to floor leveler fixed contact 208, through the movable contact of the floor leveler, to floor leveler fixed contact 209, to conductor 210, to floor magnet 211, to contact 212 of floor magnet 211, to conductor 213, to floor push buttons 88 and 89, one of which has been actuated as previously stated. If the button 88 within the cab 10 was actuated, the initial circuit would pass through the contact at 88 to conductor 214, through contacts and conductors 215, 216, 217, 218, 219, and 220 past junction 221 to relay 222, to conductor 223, through stop switch 224 in cab 10, to conductor 225, to automatic cut out 226, to conductor 227, to main line terminal contact 46. In this arrangement, the relay 222 functions as does relay 68 in Fig. 4. The half wave rectification obtained from the initial circuit, operates relay 222 and closes contacts 228 and 229 of relay 222. Then all of the relays and magnets are supplied with direct or rectified current. With this arrangement it is necessary to use a transformer in order to isolate the rectifier from the primary circuit.

If the "up" button 89, instead of "up" button 88 were actuated, the initial circuit from button 89 would be to conductor 230, which functions as conductor 61 in Fig. 4, and is therefore also identified as conductor 61, to contacts 62 and 63 to conductor 65 to junction 221, from whence the initial circuit would be the same as previously explained in connection with "up" button 88.

The relays and magnets are supplied with full wave rectified current incident to closing of contacts 228 and 229. Full wave rectified current circuits are established along the courses indicated by the double arrow head and the main switches 50 and 52 are closed, the brake 72 is released, the time element or thermal device 231 is shunted out of the circuit, and the retiring cam 232 is operated. The initial circuit through relay 222, conductor 223, and stop switch 224 is continued, thereby making it possible for a person in the cab 10 to interrupt the full wave rectified current circuit and stop the motor 12. The opening of the contacts 62 and 63 associated with the cut out device 64, makes it impossible for anyone outside the cab to interfere with the operation of the cab. The time or thermal cut out device 226 serves to interrupt the initial circuit if after a determinable time period the initial circuit is not interrupted by operation of the cab and subsequent interruption of the various circuits through the action of the automatic device 90 that stops the cab when it has reached a selected floor. The time or thermal device 226 is intended to function for cutting out the rectifier after a given period of time, in such instances as where a door to the cab has not been closed, and the initial circuit would be closed by operation of one of the floor push buttons such as 89. Under such circumstances the half wave rectified current operates relay 222, however, an open floor switch 19 or gate switch 234 precludes rectified current passing from conductor 47 to conductor 233, brake control switch 30 and main switches 50 and 52, consequently the motor 12 does not operate. The operation of the various magnets and/or switches such as 203, 206, and 211, as well as retiring cam 232, by the rectified current is under such circumstances, of no avail. In order to protect the rectifier against supplying rectified current to the last mentioned devices, the thermal or time cut out 226 is provided. As soon as the cut out 226 operates, the circuit is opened and the system is blanked.

The contactors and relays shown in Fig. 5 are all responsive to and operable by direct current.

Figure 6:
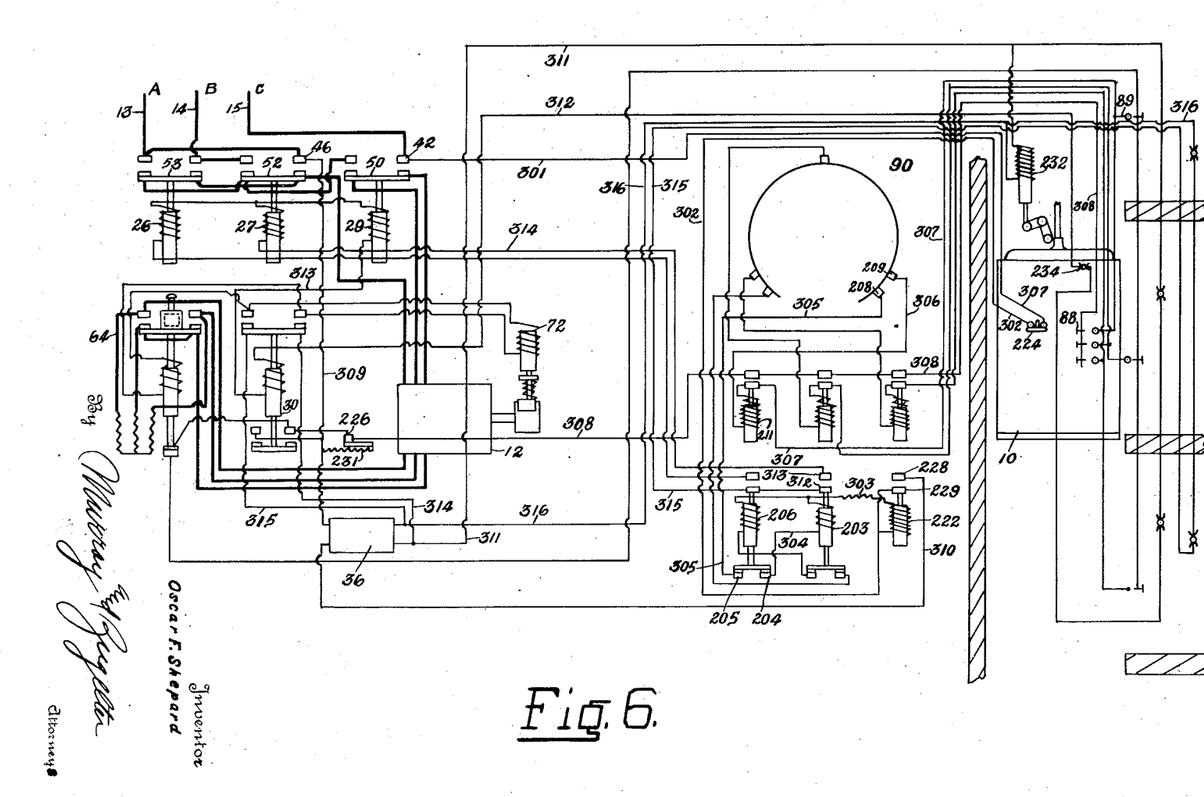
Fig. 6 shows another form of system embodying the invention.

In the arrangement disclosed in Fig. 6, all contactors are direct current devices, and the relays are alternating current devices. Reference characters used in Fig. 4 and in Fig. 5 will be used as much as possible to indicate like elements. This arrangement comprises an automatic floor leveling device 90, similar to that shown in Fig. 5. The initial circuit, beginning at main switch contact 42 follows conductor 301, to stop switch 224 in cab 10, to conductor 302 to relay 222, to resistance 303, to interlock magnet 203, to conductor 304, through switch contacts 204 and 205, to conductor 305, through contacts 208 and 209 of floor leveler 90, to conductor 306, through control magnet 211, to conductor 307 to floor push buttons 88 and 89. Assuming that button 88 is actuated, the circuit continues to conductor 308 to cut out 226, through resistance or thermal member 231, to conductor 309 to main line contact 46. As soon as relay 222 is operated, a circuit is closed through the rectifier 36. This circuit through the rectifier is identical from main line contact 42 to relay 222, but passes around the coil of relay 222 by way of switch contacts 229 and 228 to conductor 310, to rectifier 36 to conductor 309, to main line contact 46. Immediately the rectifier is brought into circuit, the direct current leaving the rectifier by conductor 311 operates the brake control 30 and main switches 50 and 52, providing all the floor switches, gate switches, etc. are closed. The operation of the interlock 203 closes the contacts 312 and 313 wherefore the motor 12 is placed in operation. Direct current then passes from the rectifier to conductor 314 to the brake release 72 and to the cut out 64, and returns to the rectifier by way of conductor 315. The circuit to the main switches is from rectifier 36 to conductor 311, through the safety switches to conductor 312, to brake control 30 to conductor 313, to potential device 29, to magnet 27 to conductor 314, through contacts 313 and 312 to conductor 315, to safety devices to conductor 316 to rectifier 36. In this arrangement the device 226 functions to cut out the rectifier after a determinable period in event the brake control 30 is not actuated to short circuit the element 231.

Figure 7:
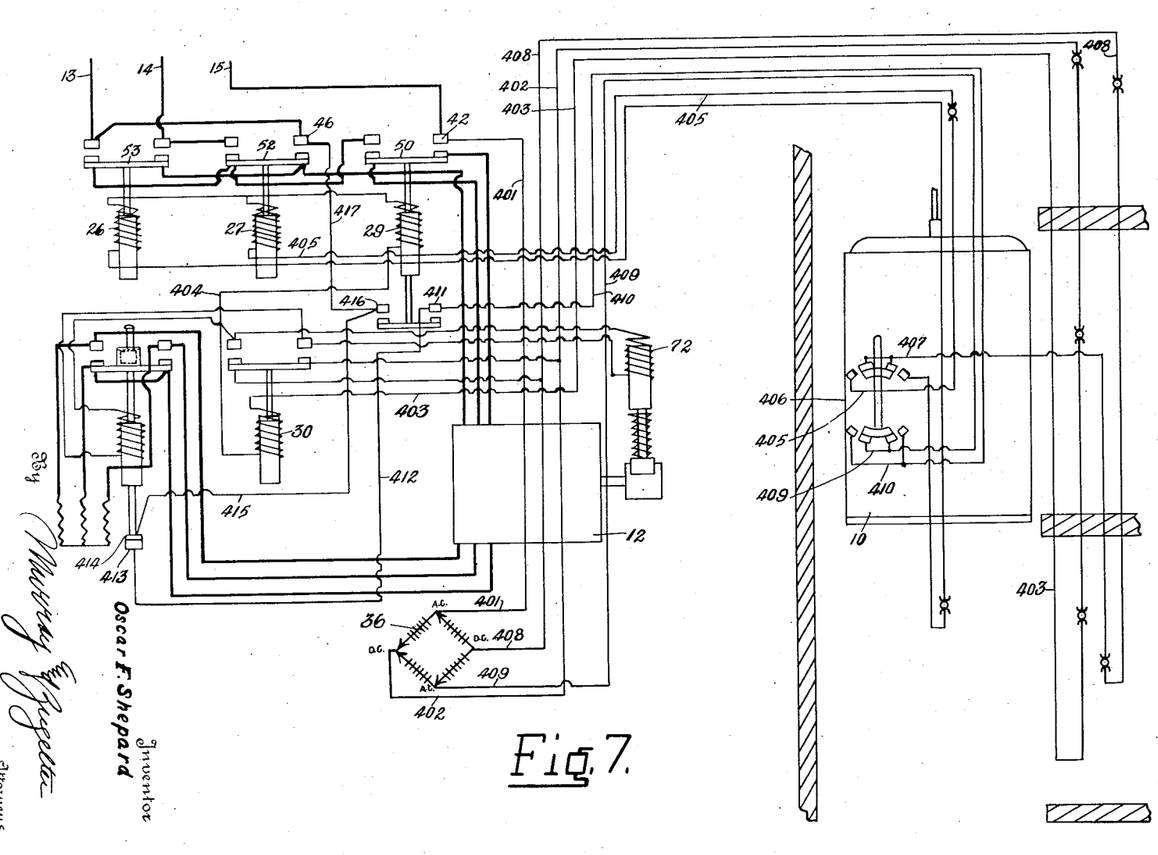
Fig. 7 shows another form of the system embodying the invention.

In Fig. 7 all contactors are direct current devices. Main line contact 42 is connected by means of conductor 401 to one A. C. terminal of rectifier 36. The other A. C. terminal of the rectifier is connected to conductor 409 to car switch contacts, to conductor 410 to contact 411 to conductor 412 to contacts 413 and 414, conductor 415, contact 416, conductor 417, to main line contact 46. The D. C. circuit leaves one D. C. terminal of the rectifier to conductor 402 to safety devices to conductor 403 to brake control 30 to conductor 404 to potential device 29 to magnet 27 to conductor 405 to manually operable switch 406. Assuming that the elevator is to be moved upward, the switch 406 would be actuated to connect conductor 405 with conductor 407 and to conductor 409 with conductor 410. The circuit then continues along conductor 407, through safety devices to conductor 408 to other D. C. terminal of rectifier 36. In this arrangement the use of half wave rectification is dispensed with, all current being rectified, except in the supply lines to the motor 12. If desired, a suitable protecting device, for example, a reverse phase relay may be introduced into any of the various circuits, especially into the so-called initial circuits, for protecting the mechanism against irregularities or defects that may develop in the main power supply. Inasmuch as the use of such protective devices is common in the art, same are not disclosed herein, notwithstanding the fact that under present practice, such devices are invariably provided. Any one of various types of rectifiers may be used, for example, plate rectifiers, tube rectifiers, etc. Various modifications readily suggest themselves to one skilled in this art, and accordingly, the disclosures herein are submitted as illustrative of a few forms of the invention, and are not to be understood as being restrictive of the invention to the specific forms shown.

What is claimed is:

1. In a controllable electric system, the combination of a device responsive to alternating current, an alternating current source of supply, direct current responsive means including a relay connected to the alternating current source of supply controlling inclusion and exclusion of said device in and out of circuit with said alternating current source of supply, and means for providing rectified current from said alternating current source of supply for operating said direct current responsive means.

2. In a controllable electric system, the combination of a device responsive to alternating current, an alternating current source of supply, direct current responsive means controlling inclusion and exclusion of said device in and out of circuit with said alternating current source of supply, means for providing rectified current from said alternating current source of supply for operating said direct current responsive means, and means for rendering the rectifying means inoperative after a determinable time interval in event conditions in the system are ineffective for including the device in circuit with the alternating current source of supply.

3. In a direct current magnetic switch mechanism, the combination of an alternating current power source including a circuit to be controlled, a direct current translating device, a direct current relay, a transformer, a rectifier and a circuit closing device, all electrically connected for providing a direct current circuit and for providing half wave rectified current from the power source for actuating the direct current relay for providing full wave rectified current to the translating device for closing the direct current circuit and for closing the circuit to be controlled.

4. In combination an alternating current source of power supply, a rectifier, a direct current translating device, a relay, and a circuit closing device so arranged that the closing of the circuit closing device closes the circuit of the relay and the direct current translating device whereby a current too small to actuate the direct current translating device, actuates the relay which on closing its contacts, fully energizes the rectifier to supply direct current to the direct current translating device for actuating the translating device, and the opening of the circuit closing device opens the circuit of the direct current translating device and the circuit of the relay.

5. In combination an alternating current source of power supply, a rectifier, a direct current translating device, a relay, a circuit closing device, and a time interval relay, so arranged that the closing of the circuit closing device closes the circuit of the relay and the circuit of the direct current translating devices including the time interval relay, the first mentioned relay operating on a current sufficient to close its contacts but insufficient to actuate the translating device, thereby fully energizing the rectifier for supplying direct current to and actuating the direct current translating device, the time interval relay arranged to open the circuit of the direct current translating device and the first mentioned relay after a given time interval in case the direct current translating device does not function.

6. In an electric motor control system, the combination of an alternating current motor, an alternating current source of supply, direct current responsive means including a relay connected to the alternating current source of supply controlling inclusion and exclusion of said motor in and out of circuit with said alternating current source of supply, and means for providing rectified current from said alternating current source of supply for operating said direct current responsive means.

7. In an electric motor control system, the combination of an alternating current motor, an alternating current source of supply, direct current responsive means controlling inclusion and exclusion of said motor in and out of circuit with said alternating current source of supply, means for providing rectified current from said alternating current source of supply for operating said direct current responsive means, and means for rendering the rectifying means inoperative after a determinable time interval in event conditions in the system preclude operation of the motor.

8. In a controllable electric system, the combination of a device responsive to alternating current, an alternating current source of supply, direct current responsive means controlling inclusion and exclusion of said device in and out of circuit with said alternating current source of supply, said means including a circuit closing relay having electrical operating connection with the alternating current source of supply, and means for providing rectified current from said alternating current source of supply for operating said direct current responsive means, the means comprising said relay operating for embracing the rectifying means across the alternating current source of supply lines and subjecting the rectifying means to the full voltage of said supply lines upon closing of a circuit of rectified current, and for relieving the rectifying means from the full voltage of said supply lines upon opening of the rectified current circuit.

9. In a controllable electric system, the combination of a device responsive to alternating current, an alternating current source of supply, direct current responsive means controlling inclusion and exclusion of said device in and out of circuit with said alternating current source of supply, said means including a circuit closing relay having electrical operating connection with the alternating current source of supply, means for providing rectified current from said alternating current source of supply for operating said direct current responsive means, the means comprising said relay operating for embracing the rectifying means across the alternating current source of supply lines and subjecting the rectifying means to the full voltage of said supply lines upon closing of a circuit of rectified current, and for relieving the rectifying means from the full voltage of said supply lines upon opening of the rectified current circuit, and means for automatically rendering the rectifying means inoperative after a determinable time interval in event conditions in the system are ineffective for including the device in circuit with the alternating current source of supply.

10. In a controllable electrical system, the combination with a device responsive to alternating electrical current, an alternating current source of supply, and switching means for connecting and disconnecting said device and the alternating current source of supply, of switch operating means and comprising a rectifier having an electrical connection with the alternating current source of supply, a relay controlling inclusion and exclusion of the rectifier in the alternating current source of supply circuit for producing and terminating a rectified current operating circuit, the relay comprising a coil for electrical connection with the alternating current source of supply and with the rectified operating circuit, and means actuated by said coil for so connecting the rectifier with the alternating current source of supply as will subject the rectifier to the full voltage of the alternating current source of supply, a circuit controlling means electrically connected with the coil of the relay for opening and closing the rectified current circuit through the coil whereby to actuate the means of the relay and the rectifier is subjected to and relieved from the full voltage load of the alternating current source of supply, and means responsive to rectified current from the rectifier for operating the switching means.

11. In a controllable electrical system, the combination of a reversible alternating current motor, an alternating current source of supply, switching means for connecting and disconnecting the motor and the alternating current source of supply and for controlling direction of rotation of the movable member of the motor, switch operating means comprising a rectifier having electrical connection with the alternating current source of supply, means responsive to rectified current for selective operation of switch parts for selecting direction of rotation of the movable motor member, a relay controlling inclusion and exclusion of the rectifier in the alternating current source of supply circuit for producing and terminating a rectified current operating circuit, the relay comprising a coil for electrical connection with the rectified operating circuit, and means actuated by said coil for so connecting and disconnecting the rectifier and the alternating current source of supply as will subject the rectifier to and relieve the rectifier from the full voltage of the alternating current source of supply, and means for selective operation of the first mentioned means and having electrical connection with the coil of the relay for initiating operation of the relay for subjecting the rectifier to the full voltage of the alternating current source of supply.

12. In a controllable electrical system, the combination of a reversible alternating current motor, an alternating current source of supply, switching means for connecting and disconnecting the motor and the alternating current source of supply and for controlling direction of rotation of the movable member of the motor, switch operating means comprising a rectifier having electrical connection with the alternating current source of supply, means responsive to rectified current for selective operation of switch parts for selecting direction of rotation of the movable motor member, a relay controlling inclusion and exclusion of the rectifier in the alternating current source of supply circuit for producing and terminating a rectified current operating circuit, the relay comprising a coil for electrical connection with the rectified operating circuit, and means actuated by said coil for so connecting and disconnecting the rectifier and the alternating current source of supply as will subject the rectifier to and relieve the rectifier from the full voltage of the alternating current source of supply, means for selective operation of the first mentioned means and having electrical connection with the coil of the relay for initiating operation of the relay for subjecting the rectifier to the full voltage of the alternating current source of supply, and means for automatically rendering the rectifying means inoperative after a determinable time interval in event conditions in the system are ineffective for including the device in circuit with the alternating current source of supply.

13. In a controllable electric system, the combination of a device responsive to alternating current, an alternating current source of supply, direct current responsive means controlling inclusion and exclusion of said device in and out of circuit with said alternating current source of supply, means for providing rectified current from said alternating current source of supply for operating said direct current responsive means, and a relay in circuit with the direct current responsive means for connecting the means for providing rectified current to the alternating source of current supply.

14. In an electric motor control system, the combination of an alternating current motor, an alternating current source of supply, direct current responsive means controlling inclusion and exclusion of said motor in and out of circuit with said alternating current source of supply, means for providing rectified current from said alternating current source of supply for operating said direct current responsive means, and a relay in circuit with the direct current responsive means for connecting the means for providing rectified current to the alternating source of current supply.

In testimony whereof, I have hereunto subscribed my name this 5th day of May, 1930.

OSCAR F. SHEPARD.